Figure 1:
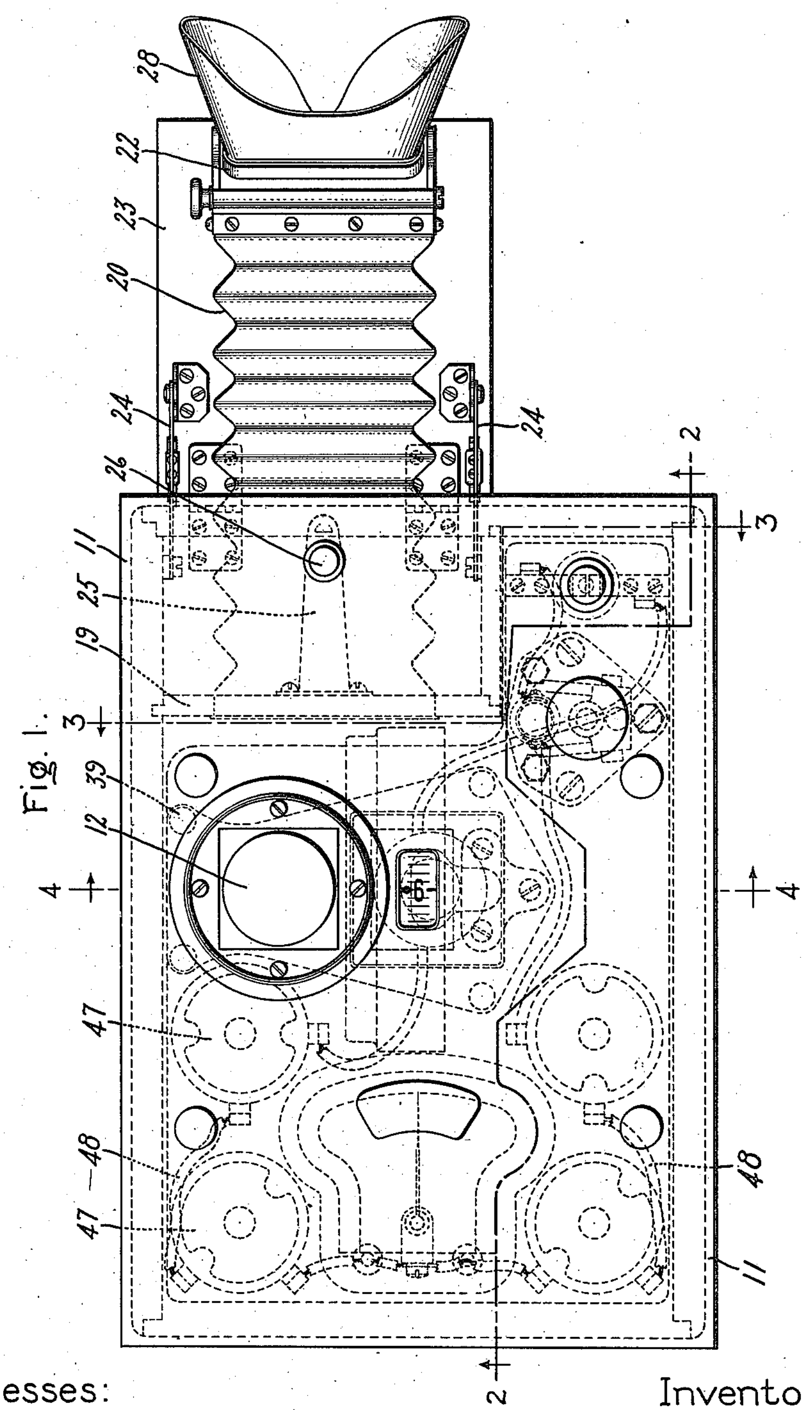

W. D'A. RYAN.
LUXIMETER.
APPLICATION FILED OCT. 15, 1909.

963,072.

Patented July 5, 1910.

3 SHEETS—SHEET 1.

Witnesses:
George W. Tilden
J. Ellis Elen

Inventor:
Walter D'A. Ryan,
by Albert G. Davis
His Attorney.

W. D'A. RYAN.
LUXIMETER.
APPLICATION FILED OCT. 15, 1909.

963,072. Patented July 5, 1910.

3 SHEETS—SHEET 2.

Witnesses:
George H. Tilden
J. Ellis Glen

Inventor:
Walter D'A. Ryan,
by Albert G. Davis
His Attorney.

W. D'A. RYAN.

LUXIMETER.

APPLICATION FILED OCT. 15, 1909.

963,072. Patented July 5, 1910.

3 SHEETS—SHEET 3.

Witnesses:

George H. Tilden

J. Ellis Glen.

Inventor:

Walter D'A Ryan, by Albert G. Davis

His Attorney.

UNITED STATES PATENT OFFICE.

WALTER D'A. RYAN, OF WATERTOWN, SOUTH DAKOTA, ASSIGNOR TO GENERAL ELECTRIC COMPANY, A CORPORATION OF NEW YORK.

LUXIMETER.

963,072. Specification of Letters Patent. Patented July 5, 1910.

Application filed October 15, 1909. Serial No. 522,785.

*To all whom it may concern:*

Be it known that I, WALTER D'A. RYAN, a subject of the King of Great Britain, residing at Watertown, county of Coddington, State of South Dakota, have invented certain new and useful Improvements in Luximeters, of which the following is a specification.

My invention relates to photometers and similar devices for measuring or comparing the intensity of light or of illumination, and particularly to devices which may be called luximeters and by means of which the intensity of illumination at any point may be determined in terms of some standard unit.

Various forms of photometers have been proposed and used, but many of them are bulky and difficult to transport; must be used by an operator of great skill and experience in order to secure reliable results; and are particularly subject to error when used to determine the intensity of illumination on account of errors inherent in the plates or surfaces exposed to the illumination which is to be measured.

The object of my invention is to produce a compact, accurate direct reading and easily operated portable photometer or luximeter, by means of which accurate determinations of the intensity of illumination may be made; in which the amount of light transmitted to the photometric or light comparing device is directly proportional to the illumination upon a plane surface at a point at which the photometer is placed, in which the comparison lamp may be accurately adjusted to give a definite amount of light; in which all of the operating parts of the instrument are inclosed in a casing and are suspended in their proper relative positions on the cover of the casing, so that when the cover is removed all parts of the instrument may be easily examined and adjusted; and in which the various parts of the instrument are so related to the eye piece that the operator can see the scale and manipulate the various parts of the instrument with a maximum of ease and convenience.

My invention will best be understood in connection with the accompanying drawings, which show one of the various forms in which it may be embodied and which form I have named a luximeter.

Figure 2:
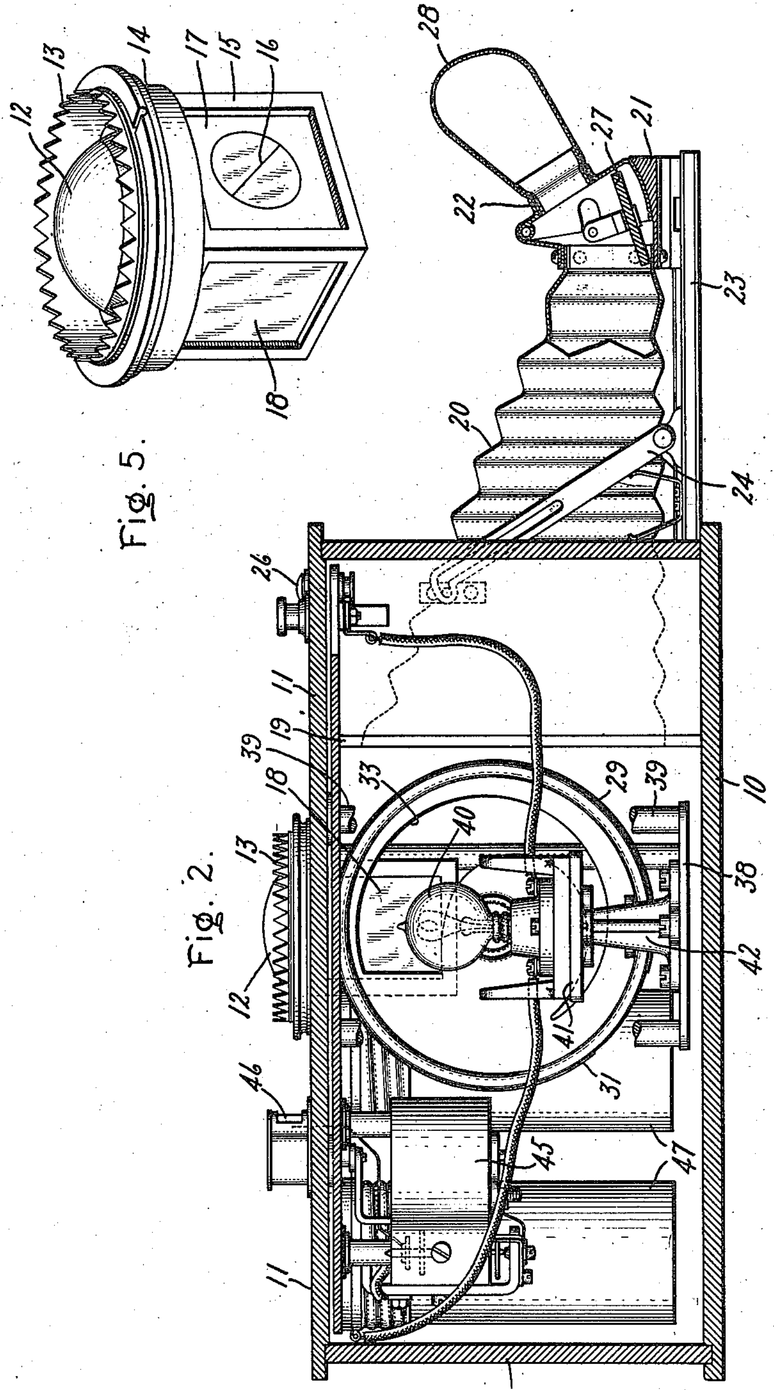
Figure 3:
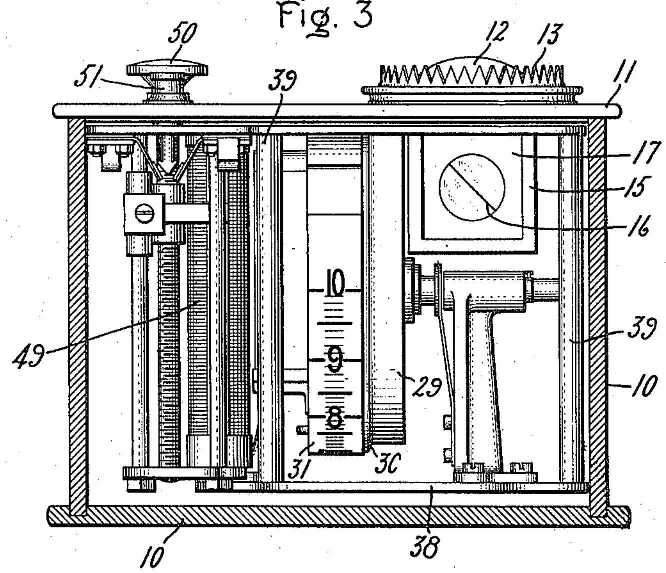
Figure 4:
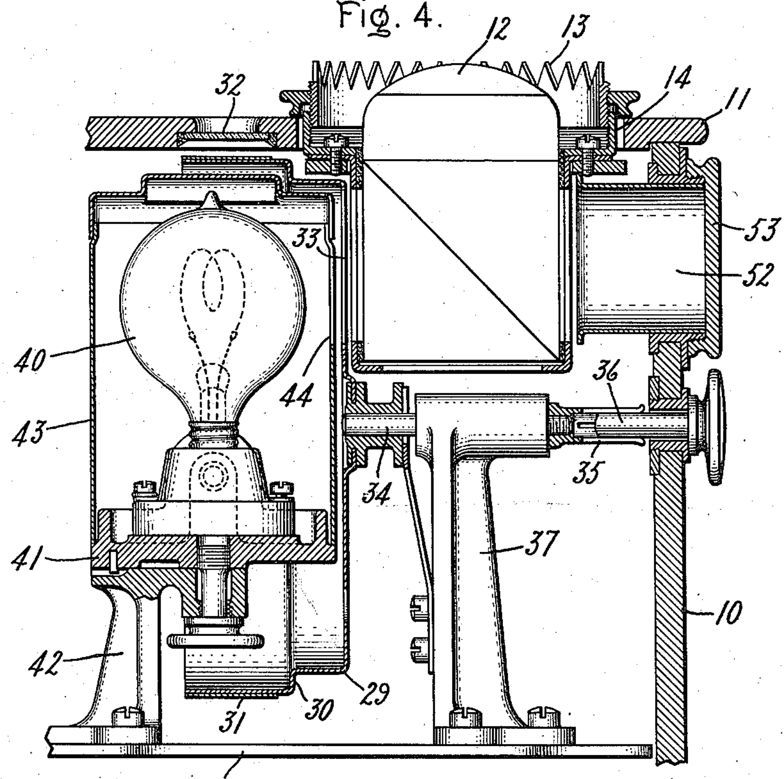

In the drawings, Figure 1 is a plan view of the instrument ready for use; Fig. 2 is a vertical section along the line 2—2 of Fig. 1; Fig. 3 is a vertical cross-section along the line 3—3 of Fig. 1; Fig. 4 is a vertical cross section along the line 4—4 of Fig. 1; Fig. 5 is a view of the preferred form of photometric device secured in fixed relation to the preferred form of light transmitting device by means of which light proportional to the intensity of illumination is transmitted to the photometric device.

The particular form of instrument shown in the drawings is a compact and easily portable device with the various parts contained in and protected by a casing or box 10, provided with a removable cover 11, detachably secured to the box. When the illumination is to be measured, the box is placed in any desired position and light directly proportional to the intensity of illumination at the point occupied by the instrument and in the plane of the cover 11 of the box is transmitted to the interior of the box by means of a light transmitting device mounted in an opening in the cover 11 and consisting of a translucent block 12 having a curved surface which projects through the cover of the box, as shown in Figs. 2, 4 and 5, and through which light is transmitted to the interior of the box. The surface of the translucent block 12 is approximately spherical in shape and by properly shaping the surface of the block the light transmitted by the block 12 may be made directly proportional to the intensity of illumination. In general work, the intensity of light incident upon a given surface, commonly called the test surface, is the only quantity which it is practical or even desirable to measure and in an accurate instrument the light intensity which is measured must be strictly proportional to the light incident upon the test surface. Accurate results would be obtained by observing a plane which is a perfect diffuser of light, since the light incident upon such a surface at any angle is credited only with its true intensity. There is no available surface which accurately meets these requirements and the best method is to use some form of translucent test surface and to observe the transmitted light from a point directly beneath that surface. A given horizontal surface is illuminated not only by rays of light at right angles to the surface, but also by rays of light which strike the surface at all inclinations from the vertical to the horizontal, and experience has shown that the light transmitted through a flat test surface of translucent material is not a true measure of the illumination to which the surface is exposed, because if a plane diffusing surface be illuminated by rays of light which form only a small angle with the surface, and thereby a given intensity of illumination is secured, and then the diffusing surface is replaced with a similar translucent material, the light transmitted through the translucent surface will be of greater intensity than the illumination of the diffusing surface, and the difference will become larger as the angle between the rays of light and the surface becomes smaller. In my invention this source of error is avoided and the light transmitted through the block 12 obeys Lambert's law of the cosines with reference to intensity of illumination produced by light incident at any inclination and from any direction upon a plane surface occupying the position of the block 12, which is practically the plane of the cover 11.

In the preferred construction which is shown in detail in the drawings, the curved surface of the block 12 is made substantially spherical and the light transmitted to the interior of the box 10 through the block 12 is rendered proportional to the illumination by shading a portion of the surface of the block 12 by any suitable device, such as a ring 13 mounted concentric with the block and projecting perpendicularly from the cover 11. As clearly shown in the drawings, the upper edge of the ring is serrated for the purpose of accurately adjusting the amount of light which will fall upon the curved surface of the block 12 and by properly proportioning the height of the ring and the shape and number of serrations in the upper edge of the ring, the required correction can be accurately made. Other means may be used for shading the edges of the light transmitting surface of the block 12, but the ring shown in the drawings and above described has been found to give good results in practice and is the preferred form of construction.

The light transmitting block 12 is mounted in the opening in the cover 11 by means of a supporting ring 14 and the light transmitted through block 12 may be measured by any suitable photometric device mounted in the box in proper relation to the block 12. The photometric device which I prefer to use is mounted in a framework 15 secured to the ring 14, and is a form of Joly screen comprising a cubical block of translucent material divided by a diagonal slit or diaphragm 16, one side of which is illuminated by the light transmitted through the block 12 and the other side of which is illuminated by the light from a comparison lamp in the box 11. The slit 16 becomes invisible when the illumination on the two sides of the slit is equal. As best shown in Fig. 5, the photometric device has one surface covered by an opaque covering 17 provided with a circular opening so related to the photometric device that the circular opening is bisected by the slit or diaphragm 16. As best shown in Fig. 4, in which the photometric device is shown in section, one surface of the photometric device receives light from the translucent block 12, while another surface 18 is exposed to the comparison lamp, and on looking at the observation surface of the photometric device the observer sees a disk, one half of which is illuminated by the light from the block 12 and the other half by light from the comparison lamp.

In order that the observer may inspect the observation surface of the photometric device, and thereby compare the illumination on one side of the slit or diaphragm 16 with that of the other side, some suitable form of eye piece is provided in one end of the box and in order to make the photometer more compact the eye piece is preferably constructed to fold into a recess in the box 10 when the photometer is not in use, and to be extended to the proper position when an observation is to be taken. In the particular instrument shown in the drawings, a recess is formed in one end of the box 10 by a partition 19 which has an opening in alinement with the observation surface of the photometric device when the cover 11 is in place. An extensible bellows 20 is secured at one end to the walls of the opening in the partition 19 and is connected at the other end to a sliding head 21 which has an opening or eye piece 22 through which the photometric device may be observed. The sliding head 21 slides upon and is supported by a door 23 which is hinged to the box 10 and closes the recess in the end of the box 10 when the bellows is folded up. The door is supported in its extended position by supports 24 pivoted at one end to the door and provided near the other end with slots which slide over pins secured to the walls of the box 10. After the observation is taken the head 21 is moved to the left, the bellows collapses and both the bellows and the sliding head 21 are received in the recess, whereupon the door 23 may be lifted into position to close the recess and is then held by a suitable latch 25 which engages the door and is controlled by means of a push button 26 extending through the cover 11.

In the particular arrangement shown, where the eye piece 22 is below the photometric device, inspection of the photometric device is facilitated by means of an observation mirror 27 pivotally mounted in the sliding head 21 in such a relation to the eye piece 22 and to the photometric device that the image of the observation surface in the photometric device is reflected to the eye piece where it may be easily inspected by the observer. If desired, a shade 28 may be detachably secured to the eye piece to shield the eye of the observer from all light except that received from the observation surface of the photometric device.

The illumination in the plane of the cover 11, and at the point in that plane occupied by the translucent block 12 is determined in terms of some standard unit by exposing the surface 18 to a light of known intensity, which may be obtained in various ways, preferably by means of a comparison lamp and a shutter mounted between the lamp and the photometric device to vary the amount of light received by the photometric device from the comparison lamp. The intensity of illumination of the surface 18 is controlled by any suitable form of shutter, such as the concave cylindrical shutter 29 shown in elevation in Figs. 2 and 3, and in section in Fig. 4. As best shown in Fig. 4, this shutter is in the form of a cup having a comparatively deep rim 30, on which is mounted a scale 31 in registry with a window 32 in the cover 11 and through this window the scale may be observed and the angular position of the shutter accurately determined.

The amount of light received by the surface 18 of the photometric device is varied by varying the angular position of the shutter which has a tapered slot 33 in the bottom in a position to register with the surface 18 in different angular positions of the shutter. When the shutter is in the position shown in Fig. 2 the maximum amount of light is received by the surface 18, while if the shutter is given little more than a half revolution in a counterclockwise direction, the amount of light received by the surface 18 is reduced to a minimum and if desired may be cut off entirely by the solid portion of the bottom of the shutter 29.

The shutter 29 is mounted for angular rotation upon any suitable support, such as a shaft 34 rigidly secured at one end to the shutter and having at the other end spring fingers 35 which normally grip a shutter operating handle 36 inserted through an opening in the side of the box 10 to engage the spring fingers 35. The shaft 34 is suitably journaled in a pedestal 37 fastened to a base plate 38 which in turn is suspended from the cover 11 by means of posts 39 and since the base plate 38 and all the parts mounted on it are out of contact with the walls of the casing of the box 10, the cover and all parts attached to it may be lifted from the box if the shutter operating handle 36 is moved out of engagement with the spring fingers 35.

The light directed upon the surface 18 and controlled by the shutter 29 may be derived from any suitable source preferably an electric comparison lamp 40 carried on a block 41 which is detachably secured to a pedestal 42 on the base plate 38. When the comparison lamp 40 is in position, it is practically concealed in the concave or cup-shaped shutter 29, the rim 30 of the shutter being wide enough effectually to shield the eye piece 22 from the lamp so that the inspection of the photometric device is not interfered with by light from the comparison lamp. In order to further guard against the comparison lamp illuminating the interior of the box 10 the lamp is surrounded by an opaque casing 43 which nests within the concave shutter 29 and which has in the wall adjacent the bottom of the shutter an opening 44 through which light passes from the comparison lamp and thence through the slot 33 of the shutter to the surface 18 of the photometric device.

In order that the comparison lamp may give an approximately uniform amount of light, it is necessary that the amount of current flowing through it be accurately known. An electric measuring instrument such as an ammeter 45 is suspended from the cover 11 of the box 10 with its scale plate 46 projecting through the cover of the box and facing the eye piece 22 so that the operator without moving from his position can glance at the scale plate 46 and see the amount of current flowing through the comparison lamp. The ammeter 45 is connected in series with the comparison lamp and with any suitable source of current, such as dry cells 47 suspended from the cover 11 and connected in series by means of leads 48, as shown in Fig. 1. The circuit including the comparison lamp, the measuring instrument, and the dry cells is completed through a rheostat 49 suspended from the cover 11 and having an operating handle 50 which projects through the cover in a position where it may be conveniently reached by the operator at the eye piece 22. The circuit through the lamp is controlled by a switch 51 having a handle projecting through the cover 11 adjacent the operating handle of the rheostat and normally tending to move to the open position so that the circuit through the lamp is closed only when the switch 51 is closed by the operator. The comparison lamp is therefore lighted only for the few moments required to make an observation and is automatically extinguished as soon as the operator releases the switch.

The photometric device, the comparison lamp, the shutter, the measuring instrument and its accessories all constitute a light comparing mechanism which is suspended from the cover 11 out of contact with the walls of the box 10 and which may all be removed from the box by detaching the cover 11 and lifting it away from the box. The operator is therefore enabled to inspect and to adjust all parts of the light comparing mechanism and to observe their operation in the same relation to each other which they will have when in place in the box 10, and therefore the photometer can be rapidly and accurately adjusted.

The comparison lamp is calibrated at intervals by comparing it with any suitable standard lamp. A calibrating tube 52 mounted in the side of the box in alinement with the photometric device and normally closed by the cap 53 admits light from a standard lamp to the one side of the photometric device while the light from the comparison lamp 40 is admitted to the other side and the comparison lamp may then be quickly adjusted to give a light which bears any desired relation to the standard light.

The operator may use other photometric devices than the particular screen shown and by introducing the light which is to be measured through the calibrating tube 52 instead of through the light transmitting block 12 a screen of the well known Bunsen type may be used if desired, but for general work and for accurate determination of illumination the type of photometric device shown and the light transmitting block 12 is preferred.

My invention may be embodied in many other forms than that shown and described and I therefore do not limit myself to the precise arrangement disclosed, but aim in the appended claims to cover all modifications within the spirit and scope of my invention.

What I claim as new and desire to secure by Letters Patent of the United States, is:—

1. A light transmitting device for photometers comprising a translucent block proportioned to render the light transmitted through said block proportional to the intensity of light received by a plane surface in the position of said block.

2. A light transmitting device for photometers comprising a translucent block having a surface for receiving the light to be measured and means whereby said surface receives less light near the edges than at the center and thereby the light transmitted through said block is rendered proportional to the intensity of light received by a plane surface in the position of said block.

3. A light transmitting device for photometers comprising a translucent block having a surface for receiving light to be measured, and means coöperating with said surface to render the light transmitted by said block proportional to the intensity of light received by a plane surface in the position of said block.

4. A light transmitting device for photometers comprising a translucent block having a surface which receives the light to be measured and is shaped to transmit light proportional to the intensity of illumination of a plane surface placed in the position of said block.

5. A light transmitting device for photometers comprising a translucent block having a surface for receiving the light to be measured and means mounted near the edge of said surface to shade a portion thereof from light of which the angle of incidence upon said surface exceeds a predetermined amount.

6. A light transmitting device for photometers comprising a translucent block having a surface for receiving the light to be measured, and a ring mounted concentric with said surface and having its upper edge shaped to shade a portion of said surface and thereby control the amount of light received by said surface.

7. A light transmitting device for photometers comprising a translucent block having a spherical surface for receiving the light to be measured, and means for controlling the amount of light received near the equator of said surface.

8. A light transmitting device for photometers comprising a flat opaque base having an opening through it and a translucent block mounted in said opening, said block having a curved surface which projects from said base to form a hemispherical light receiving surface.

9. A light transmitting device for photometers comprising a flat opaque base with an opening through it, a translucent block having a curved surface and mounted in said opening with said surface projecting from said base to form a hemispherical light receiving surface, and means for controlling the amount of light received by said surface at predetermined angles to said base.

10. A light transmitting device for photometers comprising a flat opaque base with an opening through it, a translucent block mounted in said opening and means projecting perpendicularly from said base near the edge of said opening to shade a portion of said surface.

11. A light transmitting device for photometers comprising a flat opaque base with an opening through it, a translucent block mounted in said opening, and a ring mounted to project perpendicularly from said base to surround said block near the edge thereof.

12. A light transmitting device for photometers having a flat opaque base with an opening through it, a translucent block mounted in said opening and having a curved surface which projects from said base to form a hemispherical light receiving surface, and a ring mounted to project perpendicularly from said base and to surround said surface near the edge thereof, said ring having its upper edge serrated to regulate the amount of light received by said surface.

13. In a photometer, the combination with a standard source of light, of a photometric screen comprising a translucent block having a light transmitting surface exposed to said standard source, a second light transmitting surface exposed to the light to be measured and proportioned to transmit light proportional to the intensity of illumination of a plane surface in the position of said block and an observation surface which permits the illumination of the other two surfaces to be compared.

14. A photometer comprising a box, a comparison lamp in said box, and a photometric screen comprising a translucent block mounted in said box with one surface exposed to said lamp, a second curved surface projecting through the walls of said box to form a hemispherical light receiving surface, and a third surface in a position to permit observation and comparison of the illumination of the other two surfaces.

15. A photometer comprising a comparison lamp, a photometric screen exposed to said lamp and to the light to be measured, and a movable shutter mounted between said lamp and said screen and having a tapered slot in registry with said lamp and screen.

16. A photometer comprising a comparison lamp, a light comparing screen exposed to said lamp and to the light to be measured, and a rotatable shutter extending between said lamp and screen and having a tapered slot therein to register with the lamp and screen in different angular positions of said shutter.

17. A photometer comprising a box, a photometric device mounted in said box to receive the light to be measured, an eye piece in the wall of said box whereby said photometric device may be observed, a comparison lamp mounted in said box, and a concave shutter adjustably mounted in position to shield said lamp from the observer and having a tapered slot in the bottom in registry with said lamp and said device.

18. A photometer comprising a box, a photometric device mounted in said box to receive the light to be measured, an eye piece in the wall of said box whereby said photometric device may be observed, a comparison lamp mounted in said box, and a circular concave shutter having a tapered slot in the bottom and rotatably mounted between said lamp and said device in a position to partially inclose said lamp and thereby shield it from the observer.

19. A photometer comprising a photometric device for receiving the light to be measured, a concave circular shutter having a tapered slot in the bottom thereof and rotatably mounted with said slot in registry with said device, and a comparison lamp mounted within the concavity of said shutter and in registry with said slot.

20. A photometer comprising a box, a photometric device mounted in said box to receive the light to be measured, an eye piece in the wall of said box whereby said device may be observed, a concave circular shutter having a tapered slot in the bottom and rotatably mounted to bring said slot into registry with said device, a comparison lamp mounted within said shutter and an opaque casing for said lamp having adjacent the bottom of said shutter an opening in registry with said slot.

21. A photometer comprising a box having a window in one wall, a photometric device mounted in said box to receive the light to be measured, an eye piece in the wall of said box whereby said photometric device may be observed, a comparison lamp mounted in said box, and a shutter rotatably mounted between said lamp and said device for controlling the illumination of said device by said lamp and having on its periphery a scale in registry with said window.

22. A photometer comprising an oblong box, a photometric device in said box, an eye piece at one end of said box whereby said device may be observed, an electric lamp in said box adjacent said device, a shutter between said lamp and said device, an operating handle for said shutter extending through one side of said box, and a switch mounted on the top of said box for controlling the circuit through said lamp.

23. A photometer comprising a box, a photometric device in said box, an eye piece whereby said device may be observed, an electric comparison lamp mounted in said box adjacent said device, a source of current for said lamp, and an electrical measuring instrument connected to said lamp and mounted with its scale plate facing said eye piece.

24. A photometer comprising a box, a photometric device in said box, an eye piece whereby said device may be observed, an electric comparison lamp mounted in said box adjacent said device, a source of current for said lamp, and an ammeter connected in series with said lamp and mounted inside said box with its scale plate outside the box and facing toward said eye piece.

25. A photometer comprising a box, a photometric device mounted in said box, a comparison lamp mounted adjacent said photometric device, a rheostat connected in series with said lamp and rheostat adjusting means projecting through the cover of said box.

26. A photometer comprising a box having an opening at one end, a photometric device mounted in said box adjacent said opening, a bellows secured at one end to the walls of said opening, an eye piece in the other end of said bellows, and means connected with said box for supporting said eye piece in definite relation to said photometric device.

27. A photometer comprising a box, a photometric device mounted in said box, an extensible bellows connected at one end to said box in alinement with said device, an eye piece at the other end of said bellows, and a mirror mounted near said eye piece to reflect the image of said device to said eye piece.

28. A photometer comprising a box having a recess at one end, an opening in the wall of said recess, a photometric device mounted in said box adjacent said opening, an extensible bellows having one end secured to the walls of said opening, a supporting member hinged to the side of the box, means for slidably supporting the other end of said bellows on said supporting member, and an eye piece on the other end of said bellows.

29. In a photometer, the combination with a box, of a detachable cover for said box carrying light comparing means comprising a photometric device, a comparison lamp, and means for controlling the light received by said device from said lamp, all mounted on said cover and removable from said box with said cover.

30. In a photometer, the combination with a box having an eye piece at one end, of a detachable cover for said box carrying light comparing means comprising a photometric device mounted in a position to be visible from said eye piece when said cover is in place, a comparison lamp, a shutter between said lamp and said device, and means for controlling the light received by said device from said lamp, all suspended from said cover and out of contact with the walls of said box.

31. In a photometer, the combination with a box, of a detachable cover for said box carrying light comparing means comprising a photometric device secured to said cover, an electric comparison lamp mounted on said cover, a source of current carried by said cover and means on said cover for controlling the light received by said photometric device from said lamp.

32. In a photometer, the combination with a box having an observation opening in one end and a control opening in the side, of a detachable cover for said box carrying light comparing means comprising a photometric device in alinement with said observation opening, a comparison lamp, and a shutter between said comparison lamp and said device, all suspended from said cover out of contact with the walls of said box, and a detachable handle extending through said control opening to engage and control said shutter.

In witness whereof, I have hereunto set my hand this 14th day of October, 1909.

WALTER D'A. RYAN.

Witnesses:

BENJAMIN B. HULL,
HELEN ORFORD.